(12) United States Patent
Fitzgerald

(10) Patent No.: US 12,220,983 B2
(45) Date of Patent: Feb. 11, 2025

(54) THREADED STRUCTURE FOR HOLDING FUEL CAP DURING FUELING

(71) Applicant: Christopher James Fitzgerald, Arvada, CO (US)

(72) Inventor: Christopher James Fitzgerald, Arvada, CO (US)

( * ) Notice: Subject to any disclaimer, the term of this patent is extended or adjusted under 35 U.S.C. 154(b) by 0 days.

(21) Appl. No.: 18/297,956

(22) Filed: Apr. 10, 2023

(65) Prior Publication Data

US 2024/0336130 A1 Oct. 10, 2024

(51) Int. Cl.
*B60K 15/05* (2006.01)

(52) U.S. Cl.
CPC ...... *B60K 15/05* (2013.01); *B60K 2015/0592* (2013.01)

(58) Field of Classification Search
CPC .......................... B60K 15/05; B60K 2015/0592
USPC ...................................................... 296/97.22
See application file for complete search history.

(56) References Cited

U.S. PATENT DOCUMENTS

| | | |
|---|---|---|
| 3,312,367 A | 4/1967 | Eisbrenner |
| 4,320,853 A | 3/1982 | Moore |
| 4,653,711 A | 3/1987 | Marshell |
| 4,746,089 A | 5/1988 | Clapper |
| 4,776,486 A | 10/1988 | Mizusawa |
| 5,031,874 A | 7/1991 | Shannon |
| 5,150,808 A | 9/1992 | Hamilton |
| 5,462,190 A | 10/1995 | Lienhart |
| 2005/0167432 A1 | 8/2005 | Gerdes |
| 2008/0000909 A1 | 1/2008 | Hagano |

FOREIGN PATENT DOCUMENTS

| | | | |
|---|---|---|---|
| CN | 100335307 C | * 9/2007 | ......... B60K 15/0406 |
| CN | 102205791 B | * 11/2013 | ......... B60K 15/0406 |
| DE | 19921738 A1 | * 11/2000 | ......... B60K 15/0406 |
| EP | 1167107 A2 | 1/2002 | |
| FR | 2876325 A1 | 4/2006 | |
| FR | 2914592 A1 | 10/2008 | |

(Continued)

OTHER PUBLICATIONS

DE-19921738-A1 (Fink H) (Nov. 16, 2000) (Machine Translation) (Year: 2000).*

(Continued)

*Primary Examiner* — Mahmoud Gimie
(74) *Attorney, Agent, or Firm* — Sheppard Mullin Richter & Hampton LLP

(57) ABSTRACT

One aspect features a fuel cap holder, comprising: a receptacle having a threaded inner surface configured to receive a threaded end of a threaded fuel cap; and at least one mount configured to attach the fuel cap holder to an inner side of a vehicle fuel panel. The at least one mount may comprise at least one through hole configured to receive a screw. The at least one mount may comprise at least one groove configured to engage at least one protuberance of the inner side of the vehicle fuel panel. The at least one groove may comprise a vertical groove configured to engage a vertical protuberance of a hinge side of the inner side of the vehicle fuel panel. The at least one groove may comprise a horizontal groove configured to engage a horizontal protuberance of a bottom side of the inner side of the vehicle fuel panel.

15 Claims, 6 Drawing Sheets

(56) References Cited

FOREIGN PATENT DOCUMENTS

KR          100236779 B1  *  1/2000
KR     20160029324 A  *  3/2016

OTHER PUBLICATIONS

KR-100236779-B1 (Choi G) (Jan. 15, 2000) (Machine Translation) (Year: 2000).*
CN-100335307-C (Nakai et al.) (Sep. 5, 2007) (Machine Translation) (Year: 2007).*
CN-102205791-B (Shinmura H) (Nov. 27, 2013) (Machine Translation) (Year: 2013).*

\* cited by examiner

THREADED STRUCTURE FOR HOLDING FUEL CAP DURING FUELING

DESCRIPTION OF RELATED ART

The disclosed technology relates to a threaded structure for holding fuel cap during fueling.

BACKGROUND

Various vehicles including automobiles include a panel with an access, a fuel tube including a neck behind the access opening, a fuel panel mounted on the vehicle for pivotal movement between open and closed positions exposing and concealing, respectively, the access opening, and a fuel cap closing the fuel tube neck and removable therefrom in response to twisting of the fuel cap relative to the fuel tube neck.

When fueling the vehicle, it is often necessary to open the fuel panel and remove the fuel cap to access the fuel tube. Various mechanisms have been proposed to reduce the likelihood of losing the fuel cap when refueling. Each of these mechanisms have limitations and drawbacks.

SUMMARY

Various aspects of the invention relate to an improved threaded structure for holding a fuel cap during fueling. The fuel cap holding structure may include a threaded portion for receiving the fuel cap and a mechanism for connecting the fuel cap holding structure to the fuel panel or other structure in proximity to the fuel tube.

In general, one aspect features a fuel cap holder, comprising: a receptacle having a threaded inner surface configured to receive a threaded end of a threaded fuel cap; and at least one mount configured to attach the fuel cap holder to an inner side of a vehicle fuel panel.

Embodiments of the fuel cap holder may include one or more of the following features. In some embodiments, the at least one mount comprises: at least one through hole configured to receive a screw or other fastener. The screw or other fastener may secure the fuel cap holding structure to the fuel panel or other structure in proximity to the fuel tube.

In some embodiments, the at least one mount comprises: at least one groove configured to engage at least one protuberance of the inner side of the vehicle fuel panel. In some embodiments, the at least one groove comprises: a vertical groove configured to engage a vertical protuberance of a hinge side of the inner side of the vehicle fuel panel. In some embodiments, the at least one groove comprises: a horizontal groove configured to engage a horizontal protuberance of a bottom side of the inner side of the vehicle fuel panel.

In some embodiments, the at least one mount comprises: at least one through hole configured to receive a screw; and at least one groove configured to engage at least one protuberance of the inner side of the vehicle fuel panel.

In some embodiments, the at least one through hole is configured to be aligned with at least one existing screw hole in the inner side of the vehicle fuel panel.

In some embodiments, the at least one groove comprises: a vertical groove configured to engage a vertical protuberance of a hinge side of the inner side of the vehicle fuel panel. In some embodiments, the at least one groove comprises: a horizontal groove configured to engage a horizontal protuberance of a bottom side of the inner side of the vehicle fuel panel.

In some embodiments, the fuel cap holder comprises at least one of: polyethylene terephthalate copolymer (PETG); PETG with carbon fiber reinforcement (PETG-CF); acrylonitrile styrene acrylate (ASA); nylon; acrylonitrile butadiene styrene (ABS); PA11; or PA12.

In general, one aspect features a method of installing a threaded fuel cap holder to a fuel panel of a vehicle, the threaded fuel cap holder having at least one through hole and at least one groove, the method comprising: guiding the at least one groove in the threaded fuel cap holder to mate with at least one flange of the inner side of the fuel panel; aligning the at least one through hole in the threaded fuel cap holder with at least one existing hole in the fuel panel; and securing the threaded fuel cap holder to the fuel panel by placing at least one fastener through the at least one through hole in the threaded fuel cap holder and into the at least one existing hole in the fuel panel.

Embodiments of the method may include one or more of the following features. In some embodiments, the at least one fastener is at least one first fastener, the method further comprising: removing at least one second fastener from the at least one existing hole in the fuel panel prior to aligning the at least one through hole in the threaded fuel cap holder with the at least one existing hole in the fuel panel. In some embodiments, the at least one second fastener holds a fuel panel clasp to an inner side of the fuel panel.

In general, one aspect features a method, comprising: opening a fuel panel of a vehicle; removing a threaded fuel cap from a fuel tube of the vehicle by rotating the fuel cap in a first direction about a longitudinal axis of the fuel tube; placing the threaded fuel cap into a threaded receptacle of a threaded fuel cap holder by rotating the fuel cap in a second direction about a longitudinal axis of the threaded receptacle, wherein the second direction is different than the first direction; and fueling the vehicle through the fuel tube.

Embodiments of the system may include one or more of the following features. Some embodiments comprise removing the threaded fuel cap from the threaded receptacle of the threaded fuel cap holder by rotating the fuel cap in the first direction about the longitudinal axis of the threaded receptacle after fueling the vehicle through the fuel tube. Some embodiments comprise replacing the threaded fuel cap into the fuel tube of the vehicle by rotating the fuel cap in the second direction about the longitudinal axis of the fuel tube after removing the threaded fuel cap from the threaded receptacle of the threaded fuel cap holder.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

The figures are not exhaustive and do not limit the present disclosure to the precise form disclosed.

DETAILED DESCRIPTION

Fueled vehicles come in many shapes and sizes, from sports cars to off-road trucks. All these vehicles include removable fuel caps. The fuel cap is generally threaded, and is removed by twisting it counterclockwise so that fuel can be added to the vehicle's fuel tank. The fuel cap can be replaced by threading it clockwise, to prevent fuel spills and to prevent contaminants from entering the fuel tank.

One problem with these vehicles concerns the storage of the fuel cap while it is removed, for example during fueling. In nearly all modern vehicles, the fuel cap is connected to the vehicle by a strap to prevent loss of the fuel cap. But some vehicles have no place to store the fuel cap while removed. Consequently, the fuel cap dangles by the strap when removed, and so may scratch the finish of the vehicle and spill fuel on the vehicle. Many vehicle owners find this unacceptable.

Many vehicles are now equipped with rudimentary fuel cap holders located on the inner side of the fuel panel. These cap holders generally consist of one or more simple flanges or protuberances that loosely hold the fuel cap if it is placed in the cap holder correctly. Many vehicle owners find these cap holders do not securely retain the fuel cap, and are tricky to use.

Embodiments of the disclosure provide threaded fuel cap holders. Users find these threaded fuel cap holders not only store the fuel caps securely, but are also simple to install on the vehicle and intuitive to use. In addition, the threaded fuel cap holders cover the somewhat sharp flanges on the inside of the fuel panel, and provide a pleasing aesthetic to the user compared with a bare inside of the fuel panel.

Figure 1:
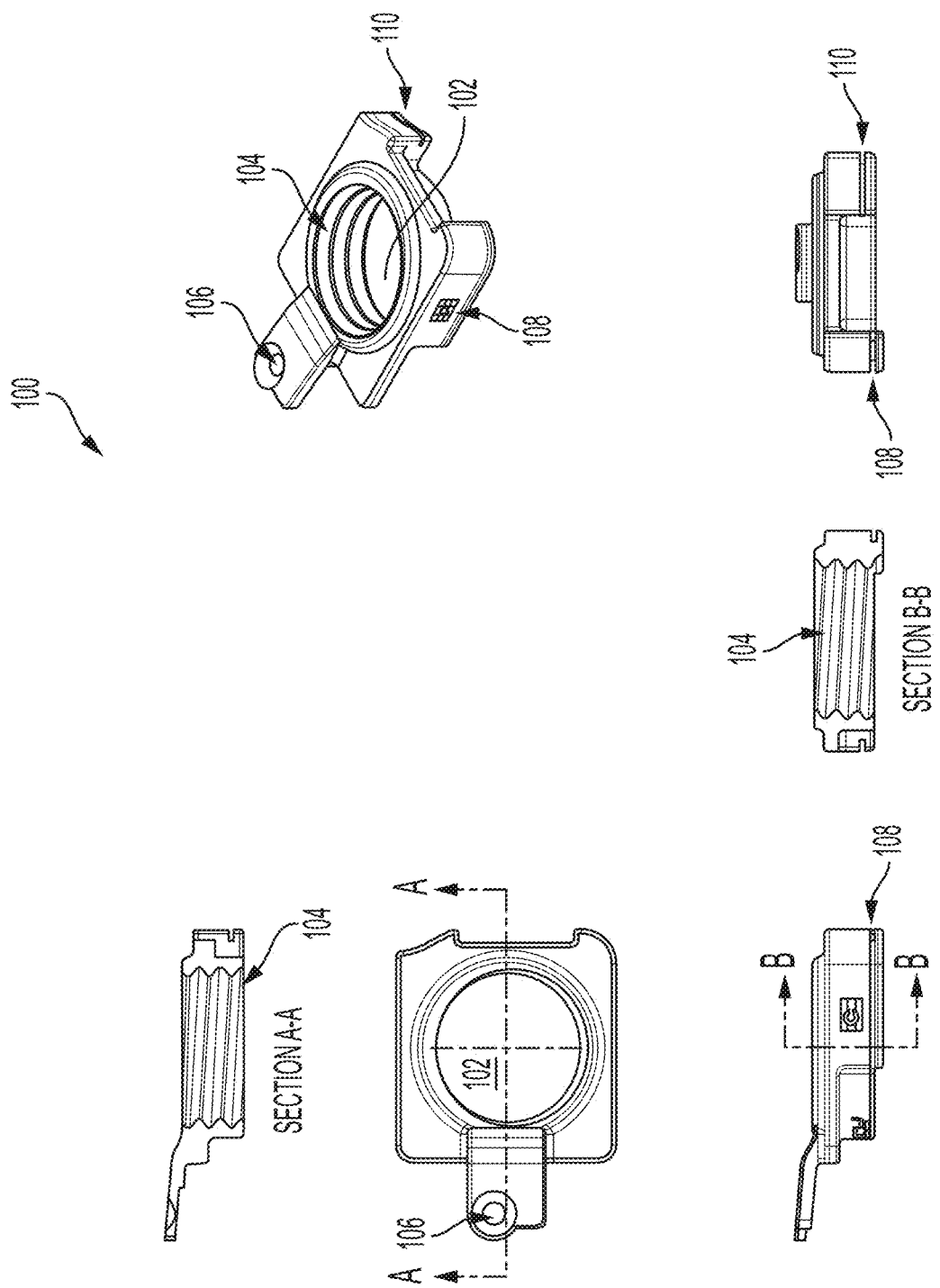
FIG. 1 provides several views of a threaded fuel cap holder according to some embodiments of the disclosed technology.

FIG. 1 provides several views of a threaded fuel cap holder 100 according to some embodiments of the disclosed technology. Referring to FIG. 1, the threaded fuel cap holder 100 includes a receptacle 102 configured to receive a fuel cap. The receptacle 102 may have a threaded inner surface 104 configured to receive a threaded end of a threaded fuel cap.

The threaded fuel cap holder 100 may have at least one mount configured to attach the fuel cap holder 100 to an inner side of a vehicle fuel panel. In some embodiments, the mount may include one or more through holes 106 configured to receive a screw. The through holes may be configured to be aligned with existing screw holes in the inner side of the vehicle fuel panel.

In some embodiments, the mount may include at least one groove configured to engage at least one protuberance or flange of the inner side of the vehicle fuel panel. In the example of FIG. 1, the grooves may include a vertical groove 110 configured to engage a vertical protuberance of a hinge side of the inner side of the vehicle fuel panel, and a horizontal groove 108 configured to engage a horizontal protuberance of a bottom side of the inner side of the vehicle fuel panel.

The threaded fuel cap holders may be fabricated from any suitable material by any suitable technique. For example, the threaded fuel cap holders may be fabricated from polyethylene terephthalate copolymer (more commonly referred to as "PETG" or PET copolymer with glycol additive), PETG-CF (PETG with carbon fiber reinforcement), ASA (Acrylonitrile Styrene Acrylate), Nylon, ABS (Acrylonitrile Butadiene Styrene), or PA11, PA12 (note both PA materials are Nylon powder media for laser sintering).

Figure 2:
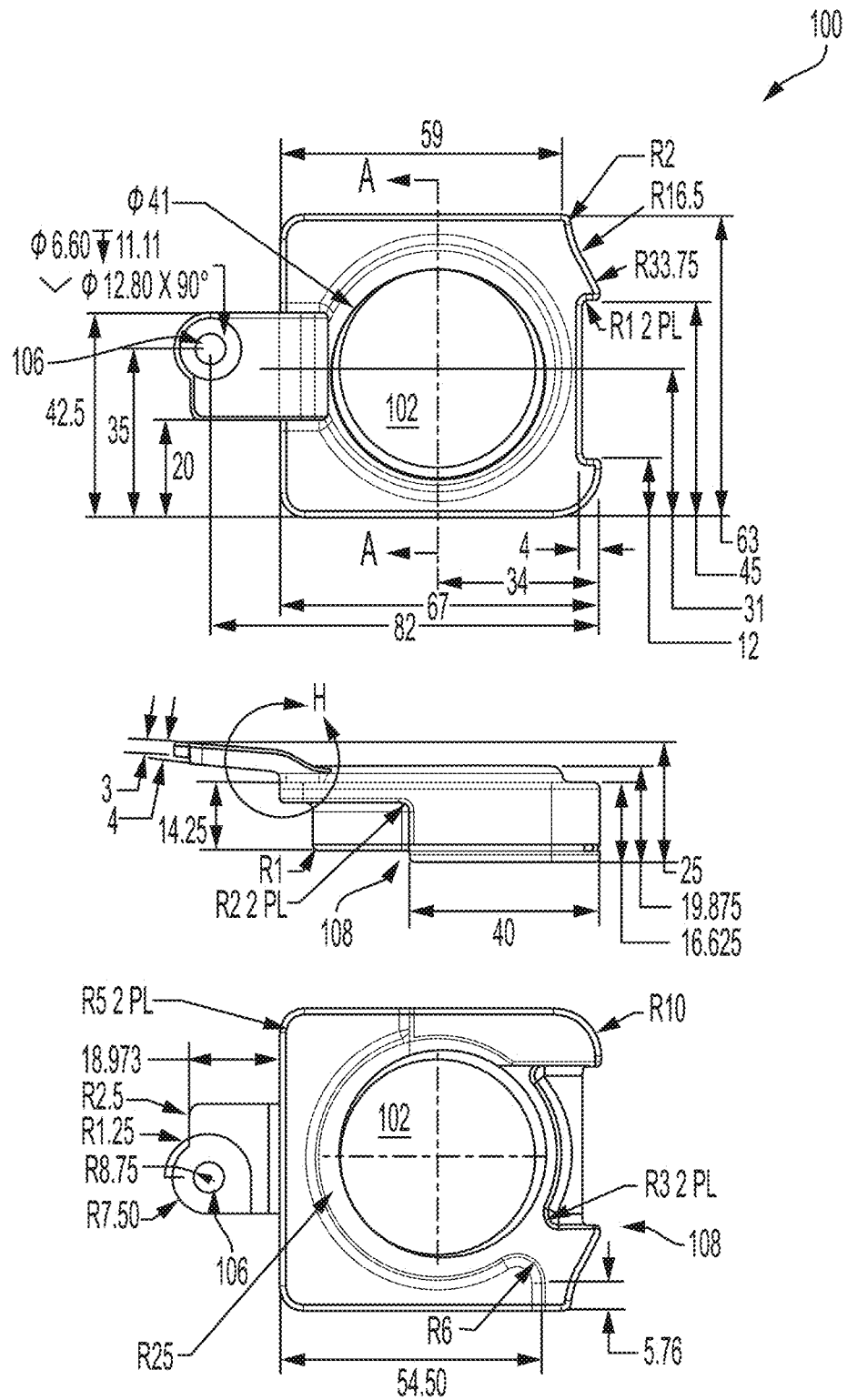
FIG. 2 illustrates an example threaded fuel cap holder where the features are sized and arranged to fit a popular truck, according to some embodiments of the disclosed technology.
Figure 2:
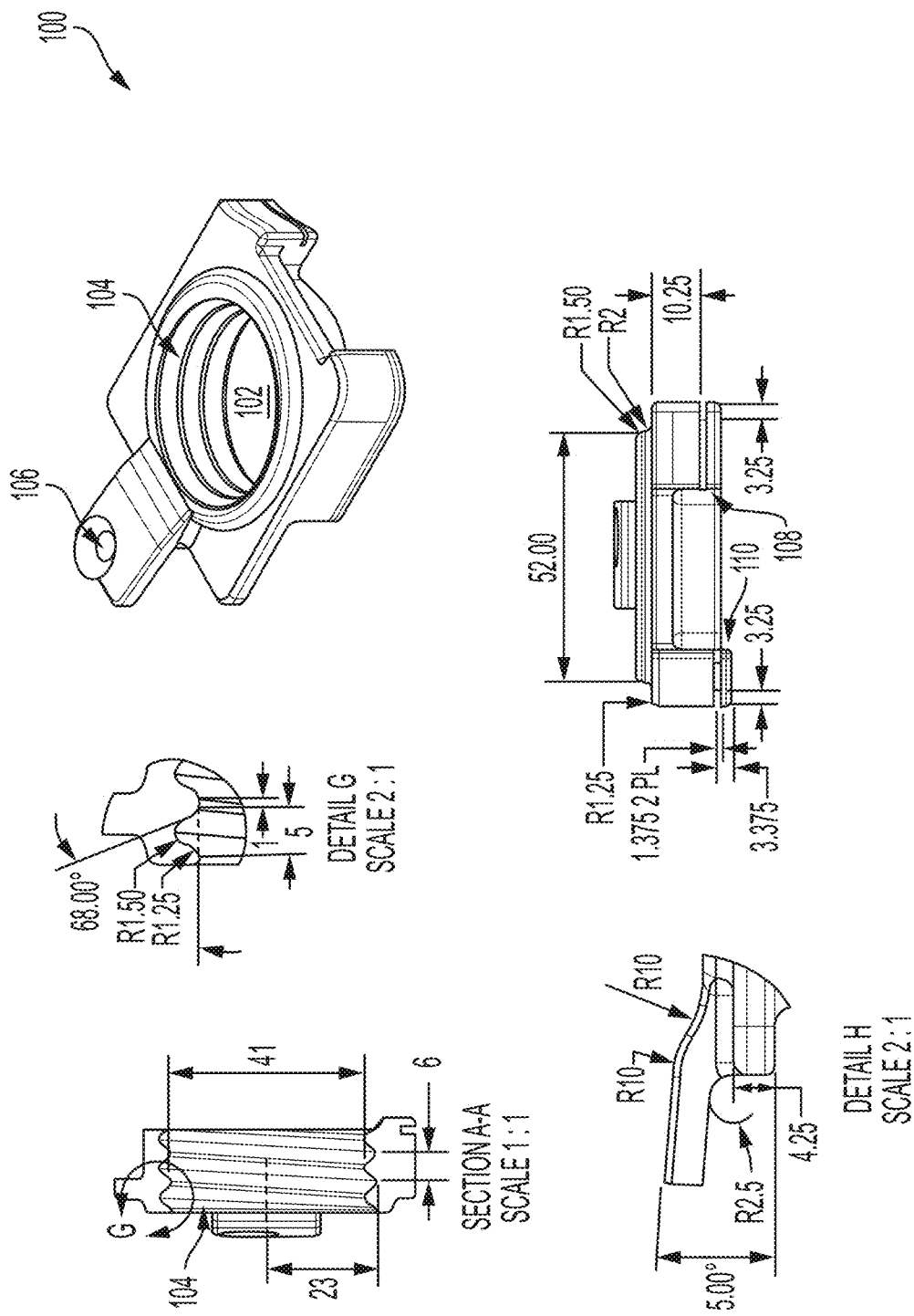

FIG. 2 illustrates an example threaded fuel cap holder where the features are sized and arranged to fit a popular truck, according to some embodiments of the disclosed technology. All dimensions are in millimeters. In other examples the features of the threaded fuel cap holder are sized and arranged to fit other vehicles.

Figure 3:
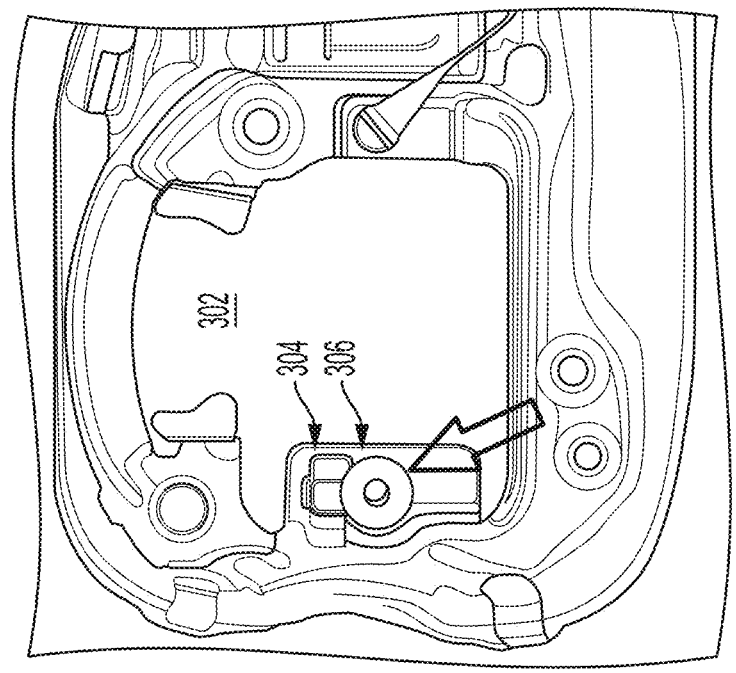

FIGS. 3-6 illustrate an installation process for a threaded fuel cap holder 300 according to some embodiments of the disclosed technology. Referring to FIG. 3, the OEM screw that holds the two-pronged fuel panel clasp 304 may be removed from an existing hole 306 in the fuel panel 302 using a screwdriver. If the panel clasp happens to fall out, it may be reinstalled, for example with its alignment tab in the corresponding slot in the fuel panel.

Figure 4:
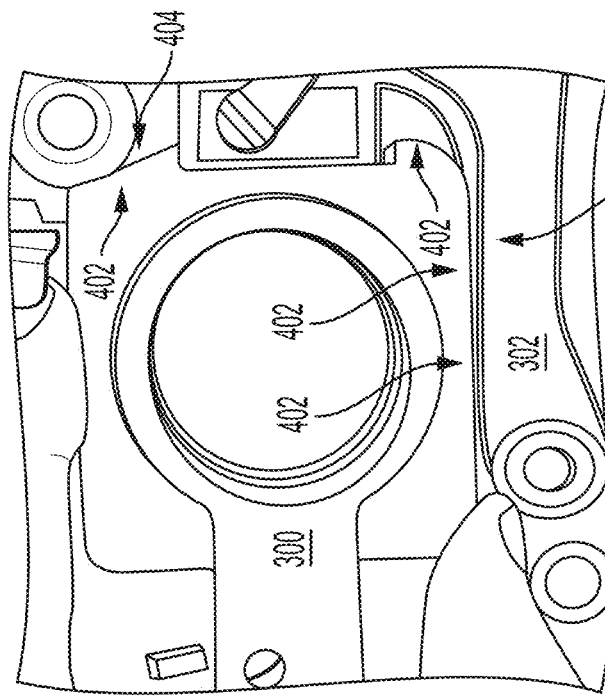
FIGS. 3-6 illustrate an installation process for a threaded fuel cap holder according to some embodiments of the disclosed technology.

Referring to FIG. 4, the threaded fuel cap holder 300 may be placed within the empty space in the center of the fuel panel. The user may then guide the grooves 402 in the threaded fuel cap holder 300 to mate with the flanges 404 in the fuel panel. In the example of FIG. 4, the user may first engage the vertical flange near the hinge of the fuel panel with the vertical groove in the threaded fuel cap holder before engaging the horizontal flange near the bottom of the fuel panel with the horizontal groove in the threaded fuel cap holder.

Figure 5:
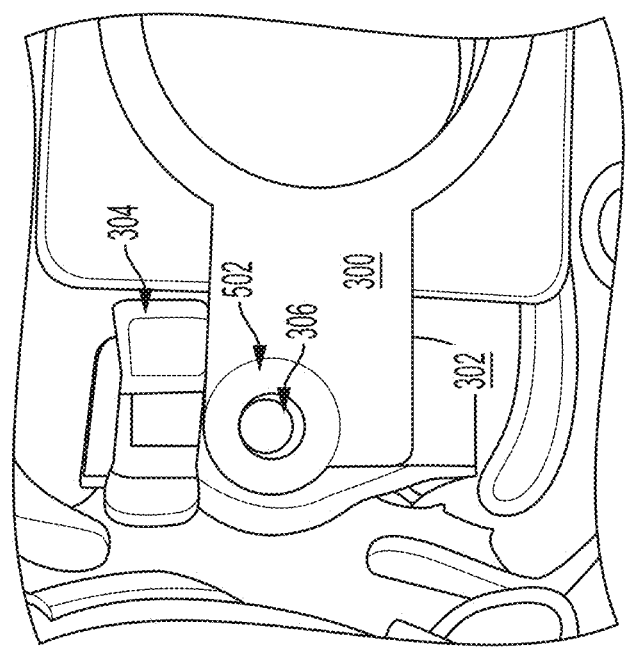

Referring to FIG. 5, the user may align a through hole 502 in the threaded fuel cap holder 300 with the existing hole for the panel clasp in the fuel panel.

Figure 6:
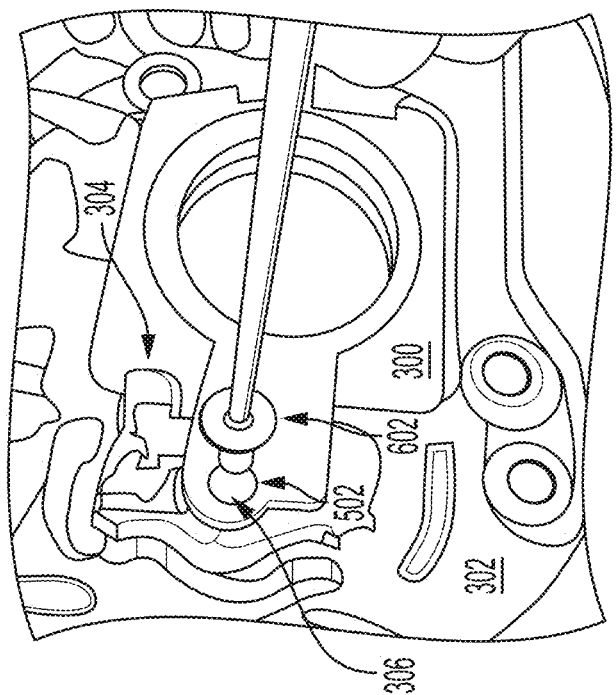

Referring to FIG. 6, the user may drive a screw 602 through the through hole 502 in the threaded fuel cap holder 300 and into the existing hole 306 for the panel clasp 304 in the fuel panel 302. The screw 602 may be the OEM screw previously removed or another suitable screw.

Figure 7:
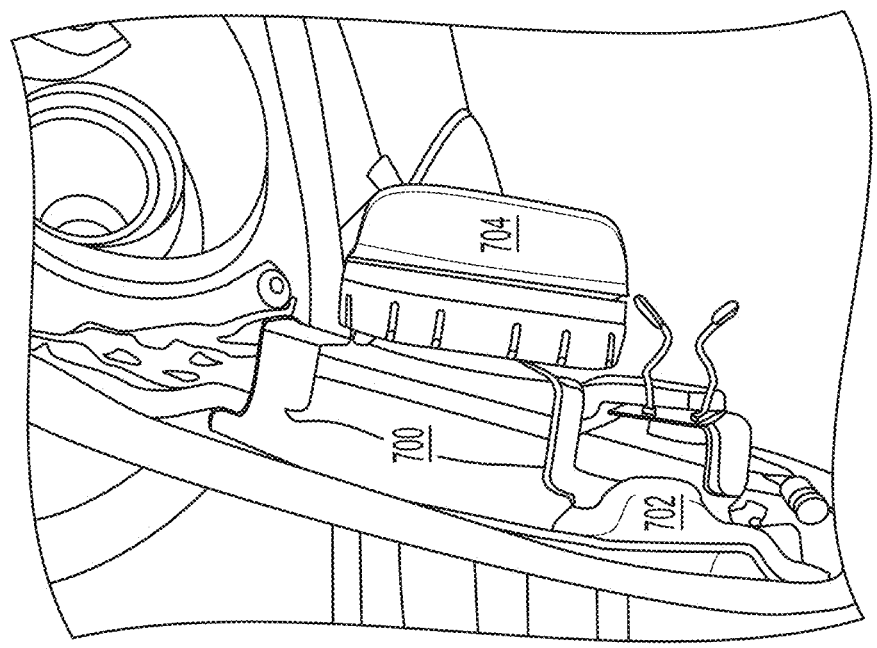
FIGS. 7 and 8 show a threaded fuel cap holder, installed on a vehicle fuel panel and holding a fuel cap, according to some embodiments of the disclosed technology.
Figure 8:
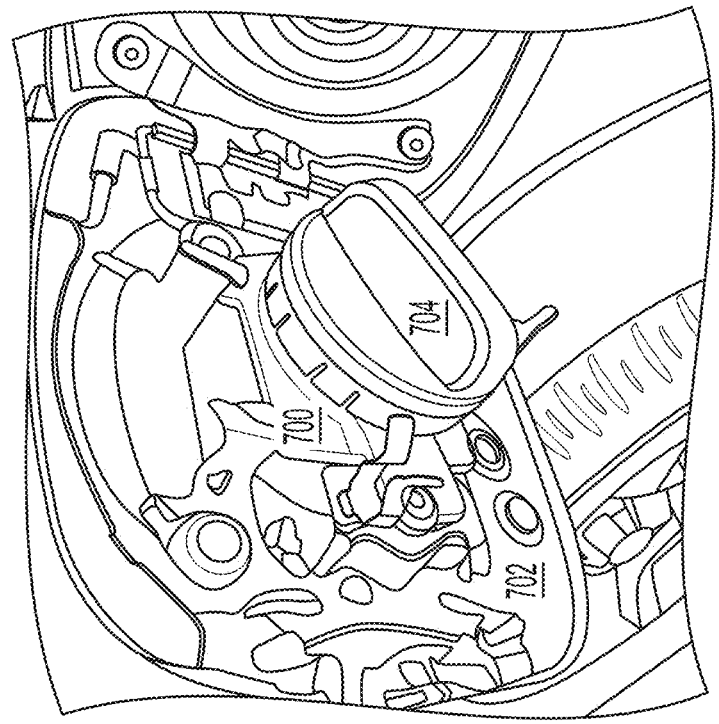

FIGS. 7 and 8 show a threaded fuel cap holder 700, installed on a vehicle fuel panel 702 and holding a fuel cap 704, according to some embodiments of the disclosed technology.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

The foregoing description of the present disclosure has been provided for the purposes of illustration and description. It is not intended to be exhaustive or to limit the disclosure to the precise forms disclosed. The breadth and scope of the present disclosure should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the disclosure and its practical application, thereby enabling others skilled in the art to understand the disclosure for various embodiments and with various modifications that are suited to the particular use contemplated. It is intended that the scope of the disclosure be defined by the following claims and their equivalence.

What is claimed is:

1. A fuel cap holder, comprising:
a receptacle having a threaded inner surface configured to receive a threaded end of a threaded fuel cap; and
at least one mount configured to attach the fuel cap holder to an inner side of an exterior facing vehicle fuel panel, wherein the at least one mount includes at least one groove configured to engage at least one protuberance of the inner side of the exterior facing vehicle fuel panel.

2. The fuel cap holder of claim 1, wherein the at least one mount comprises:
at least one through hole configured to receive a screw.

3. The fuel cap holder of claim 1, wherein the at least one groove comprises:
a vertical groove configured to engage a vertical protuberance of a hinge side of the inner side of the vehicle fuel panel.

4. The fuel cap holder of claim 1, wherein the at least one groove comprises:
a horizontal groove configured to engage a horizontal protuberance of a bottom side of the inner side of the vehicle fuel panel.

5. The fuel cap holder of claim 1, wherein the at least one mount further comprises:
at least one through hole configured to receive a screw.

6. The fuel cap holder of claim 5, wherein the at least one through hole is configured to be aligned with at least one existing screw hole in the inner side of the vehicle fuel panel.

7. The fuel cap holder of claim 5, further comprising:
a vertical groove configured to engage a vertical protuberance of a hinge side of the inner side of the vehicle fuel panel.

8. The fuel cap holder of claim 5, further comprising:
a horizontal groove configured to engage a horizontal protuberance of a bottom side of the inner side of the vehicle fuel panel.

9. The fuel cap holder of claim 1, wherein the fuel cap holder comprises at least one of:
polyethylene terephthalate copolymer (PETG);
PETG with carbon fiber reinforcement (PETG-CF);
acrylonitrile styrene acrylate (ASA);
nylon;
acrylonitrile butadiene styrene (ABS);
PA11; or
PA12.

10. A method of installing a threaded fuel cap holder, the method comprising:
guiding at least one groove in a threaded fuel cap holder to mate with at least one flange of an inner side of an exterior fuel panel, wherein the fuel cap holder comprises at least one through hole and at least one groove;
aligning the at least one through hole in the threaded fuel cap holder with at least one existing hole in the inner side of the exterior fuel panel; and
securing the threaded fuel cap holder to the inner side of the exterior fuel panel by placing at least one fastener through the at least one through hole in the threaded fuel cap holder and into the at least one existing hole in the inner side of the exterior fuel panel.

11. The method of claim 10, wherein the at least one fastener is at least one first fastener, the method further comprising:
removing at least one second fastener from the at least one existing hole in the fuel panel prior to aligning the at least one through hole in the threaded fuel cap holder with the at least one existing hole in the fuel panel.

12. The method of claim 11, wherein:
the at least one second fastener holds a fuel panel clasp to an inner side of the fuel panel.

13. A method, comprising:
opening a fuel panel of a vehicle;
removing a threaded fuel cap from a fuel tube of the vehicle by rotating the fuel cap in a first direction about a longitudinal axis of the fuel tube;
placing the threaded fuel cap into a threaded receptacle of a threaded fuel cap holder by rotating the fuel cap in a second direction about a longitudinal axis of the threaded receptacle, wherein:
the second direction is different than the first direction,
the threaded fuel cap holder is mounted to an inner side of an exterior facing vehicle fuel panel, and
at least one mount on the inner side of the exterior facing vehicle fuel panel includes at least one groove configured to engage at least one protuberance of the inner side of the exterior facing vehicle fuel panel; and
fueling the vehicle through the fuel tube.

14. The method of claim 13, further comprising:
removing the threaded fuel cap from the threaded receptacle of the threaded fuel cap holder by rotating the fuel cap in the first direction about the longitudinal axis of the threaded receptacle after fueling the vehicle through the fuel tube.

15. The method of claim 14, further comprising:
replacing the threaded fuel cap into the fuel tube of the vehicle by rotating the fuel cap in the second direction about the longitudinal axis of the fuel tube after removing the threaded fuel cap from the threaded receptacle of the threaded fuel cap holder.

* * * * *